United States Patent
Aoki et al.

(10) Patent No.: US 10,382,317 B2
(45) Date of Patent: Aug. 13, 2019

(54) TRANSFER DESTINATION SELECTING METHOD, COMMUNICATION DEVICE AND RECORDING MEDIUM

(71) Applicant: FUJITSU LIMITED, Kawasaki-shi, Kanagawa (JP)

(72) Inventors: Takashi Aoki, Nagoya (JP); Ryo Mibu, Nagoya (JP); Katsumi Sakurai, Kamo (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/177,862

(22) Filed: Jun. 9, 2016

(65) Prior Publication Data

US 2017/0005936 A1 Jan. 5, 2017

(30) Foreign Application Priority Data

Jun. 30, 2015 (CN) .......................... 2015 1 0372898

(51) Int. Cl.
*H04L 12/803* (2013.01)
*H04L 12/741* (2013.01)
*H04L 12/733* (2013.01)
*H04W 40/02* (2009.01)

(52) U.S. Cl.
CPC ........... *H04L 45/122* (2013.01); *H04W 40/02* (2013.01)

(58) Field of Classification Search
CPC ........................... H04L 47/125; H04L 45/745
See application file for complete search history.

(56) References Cited

U.S. PATENT DOCUMENTS

| | | | |
|---|---|---|---|
| 8,396,066 B1 | 3/2013 | Banerjee et al. | |
| 2005/0122962 A1* | 6/2005 | Delaney | H04L 45/54 370/352 |
| 2005/0254503 A1* | 11/2005 | Claseman | H04L 12/4625 370/395.41 |
| 2007/0174427 A1* | 7/2007 | Shigeeda | H04L 12/40 709/217 |
| 2010/0265951 A1 | 10/2010 | Fujita et al. | |

(Continued)

FOREIGN PATENT DOCUMENTS

| | | |
|---|---|---|
| WO | WO 2011/013165 A1 | 3/2011 |
| WO | WO 2012/133521 A1 | 4/2012 |
| WO | WO 2013/129671 A1 | 6/2013 |

OTHER PUBLICATIONS

Souihli et al., "Load-balancing in MANET shortest-path routing protocols", Ad Hoc Networks, vol. 7, Elsevier, 2009, 431-442.

(Continued)

*Primary Examiner* — Jamal Javaid
*Assistant Examiner* — Thad N Defauw
(74) *Attorney, Agent, or Firm* — Staas & Halsey LLP

(57) ABSTRACT

A transfer destination selecting method conducted by a communication device includes selecting, when the communication device stores, according to a destination, pieces of information indicating a plurality of other communication devices that are candidates for a transfer destination of data, one of the other communication devices to be the transfer destination from among the candidates on the basis of a number of destinations in a routing table used for controlling a data transfer and stored in each of the plurality of other communication devices.

9 Claims, 18 Drawing Sheets

(56) References Cited

U.S. PATENT DOCUMENTS

| | | | |
|---|---|---|---|
| 2011/0022726 A1* | 1/2011 | Li | H04L 49/35 709/241 |
| 2012/0106552 A1 | 5/2012 | Iwao et al. | |
| 2013/0163597 A1* | 6/2013 | Kimura | H04W 40/02 370/392 |
| 2014/0016645 A1 | 1/2014 | Nomura et al. | |
| 2014/0369235 A1* | 12/2014 | Kondo | H04W 40/02 370/254 |

OTHER PUBLICATIONS

Extended European Search Report dated Aug. 2, 2016 in corresponding European Patent Application No. 16173486.8.
Chinese Office Action dated Dec. 24, 2018 from Chinese Patent Application No. 201510372898.X, 20 pages.

* cited by examiner

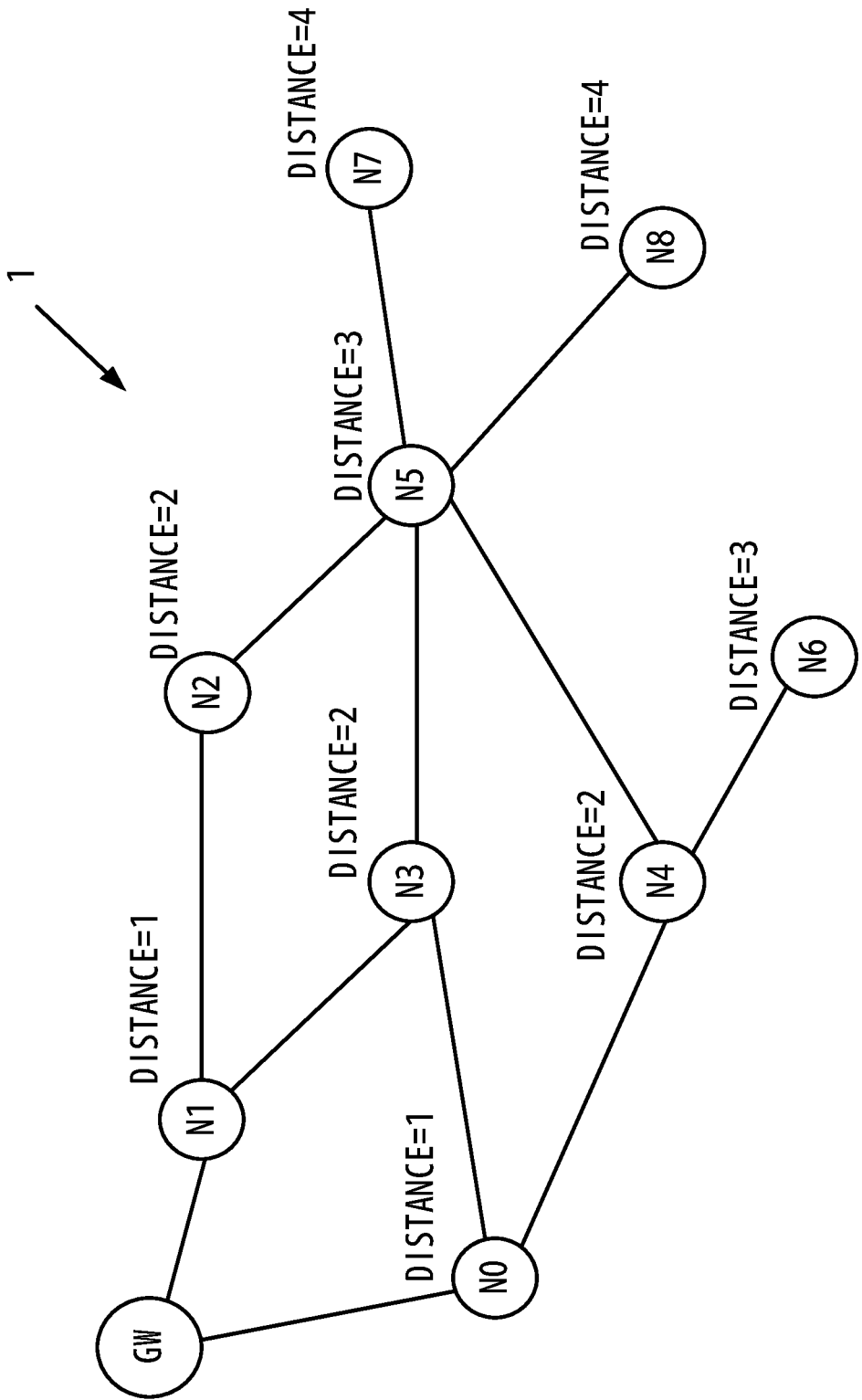
F I G. 1

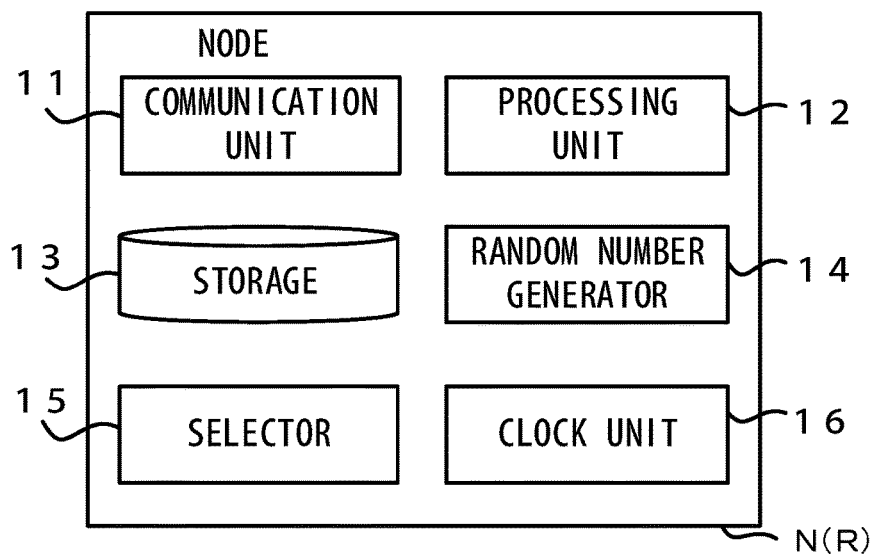
F I G. 2

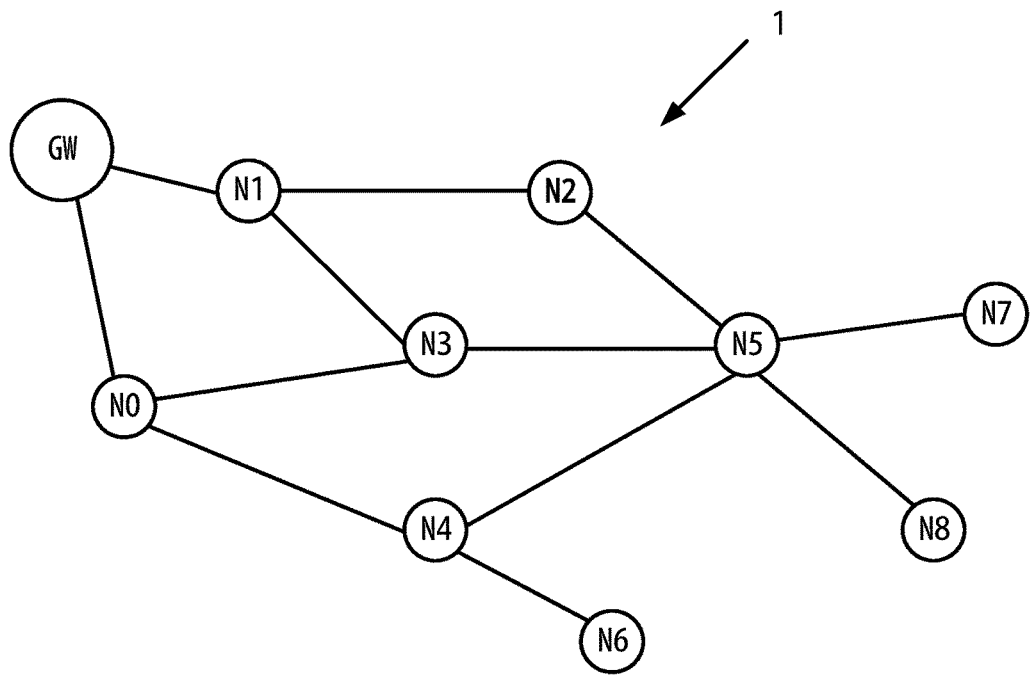
EXAMPLE OF ROUTING TABLE OF NODE N2
| G D | L D | DISTANCE | USAGE TIME | TYPE OF DEVICE | NUMBER OF USES |
|-----|-----|----------|------------|----------------|----------------|
| GW  | N 1 | 2        | 1 4 : 3 0  | 1              | · · ·          |
| N 7 | N 5 | 2        | 1 3 : 3 0  | 1              | · · ·          |
| N 8 | N 5 | 2        | 1 3 : 4 0  | 1              | · · ·          |
CURRENT TIME=15:00, TIME THRESHOLD=THREE HOURS
NUMBER OF USES FOR NODE N2=NUMBER OF GDS THAT ARE NOT TO BE EXCLUDED=3
F I G. 3

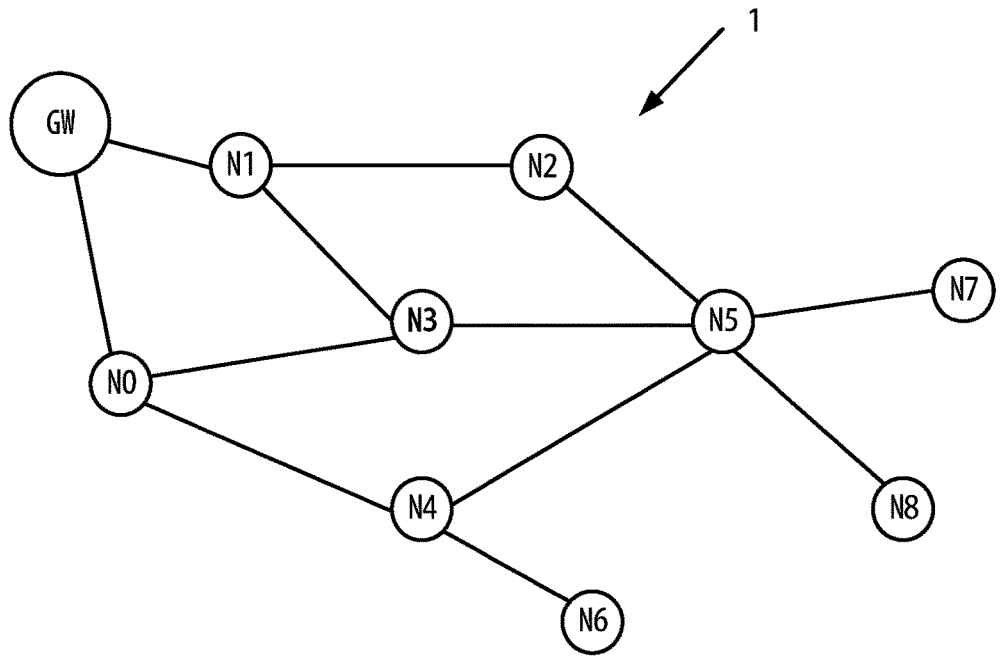
EXAMPLE OF ROUTING TABLE OF NODE N3
| GD | LD | DISTANCE | USAGE TIME | TYPE OF DEVICE | NUMBER OF USES | |
|---|---|---|---|---|---|---|
| GW | N0 | 2 | 12:30 | 1 | ... | |
| | N1 | 2 | | | ... | |
| N7 | N5 | 2 | 11:30 | 1 | ... | TO BE EXCLUDED |
| N8 | N5 | 2 | 13:30 | 1 | ... | |
CURRENT TIME=15:00, TIME THRESHOLD=THREE HOURS
NUMBER OF USES FOR NODE N3=NUMBER OF GDS THAT ARE NOT TO BE EXCLUDED=2
F I G. 4

EXAMPLE OF ROUTING TABLE OF NODE N4

| G D | L D | DISTANCE | USAGE TIME | TYPE OF DEVICE | NUMBER OF USES | |
|-----|-----|----------|------------|----------------|----------------|---|
| GW | N0 | 2 | 10:30 | 1 | ... | TO BE EXCLUDED |
| N6 | N6 | 1 | 12:30 | 1 | ... | |
| N7 | N5 | 2 | 11:30 | 1 | ... | TO BE EXCLUDED |
| N8 | N5 | 2 | 11:40 | 1 | ... | TO BE EXCLUDED |

CURRENT TIME=15:00, TIME THRESHOLD=THREE HOURS
NUMBER OF USES FOR NODE N3=NUMBER OF GDS THAT ARE NOT TO BE EXCLUDED=1

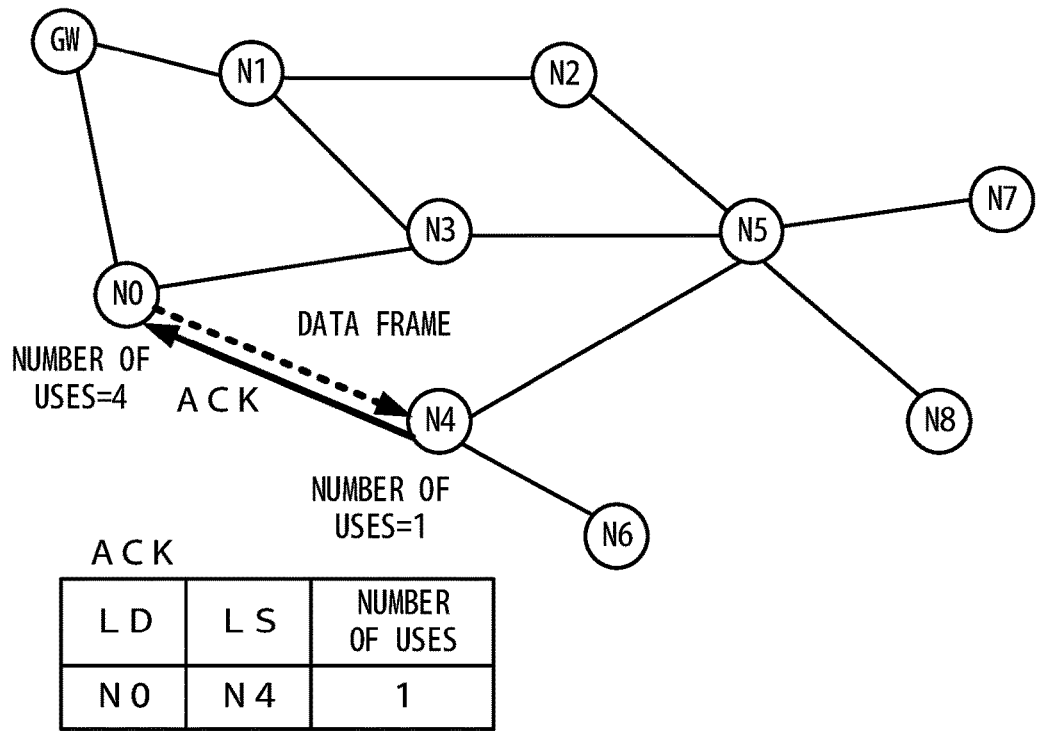
F I G. 7

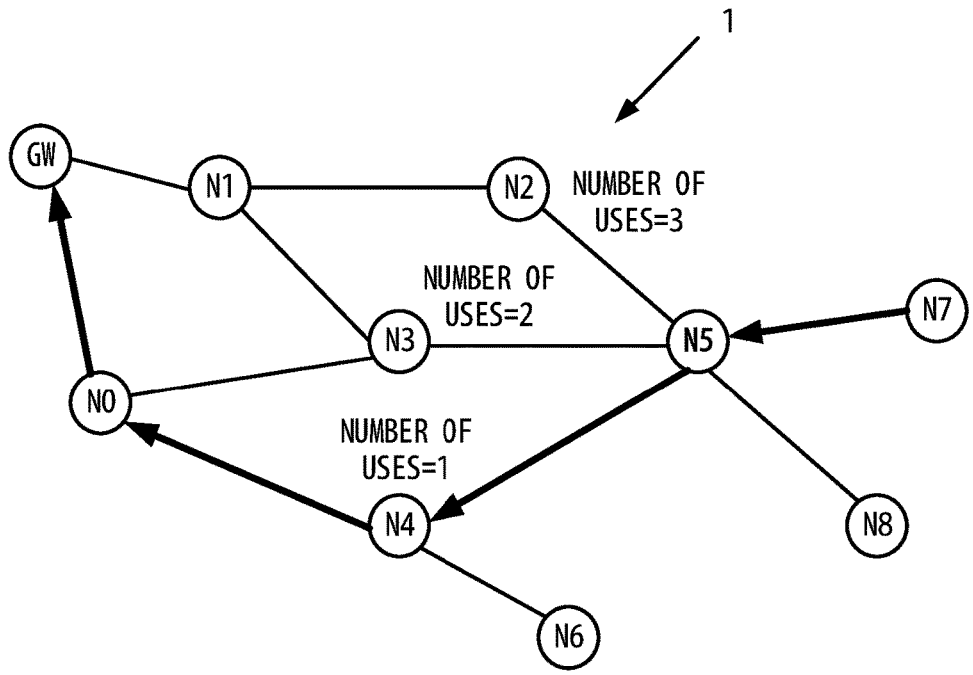
EXAMPLE OF ROUTING TABLE OF NODE N5
| GD | LD | DISTANCE | USAGE TIME | TYPE OF DEVICE | NUMBER OF USES |
|---|---|---|---|---|---|
| GW | N 2 | 3 | ... | 1 | 3 |
| | N 3 | 3 | ... | 1 | 2 |
| | N 4 | 3 | ... | 1 | 1 |
F I G. 8

EXAMPLE OF DATA FRAME

| LD | LS | GD | GS | DATA TO BE TRANSMITTED |
|----|----|----|----|------------------------|
| N5 | N7 | GW | N7 | x x x x x x x x |

FIG. 9

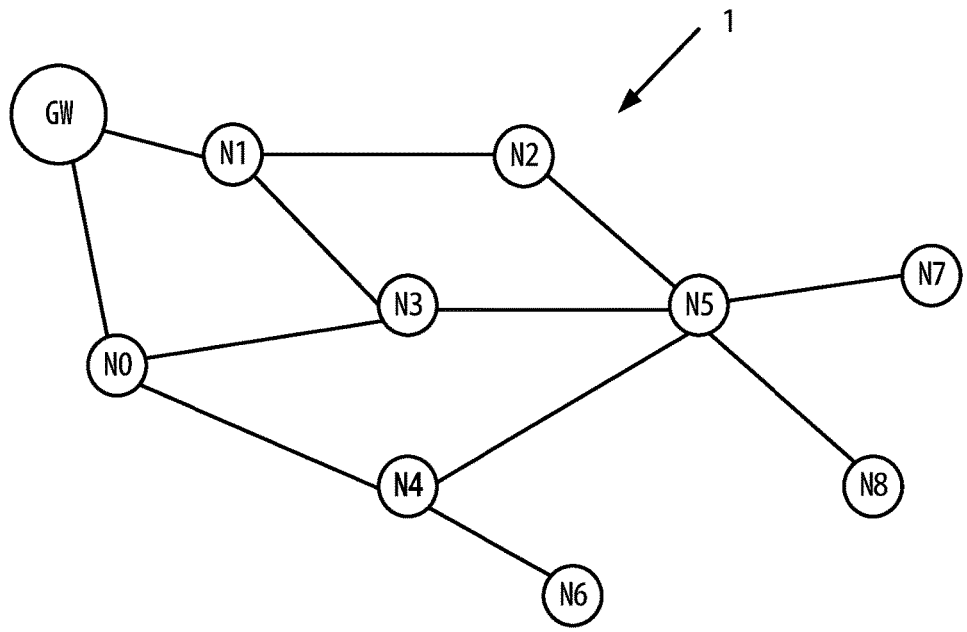
EXAMPLE OF ROUTING TABLE OF NODE N4
| G D | L D | DISTANCE | USAGE TIME | TYPE OF DEVICE | NUMBER OF USES | |
|---|---|---|---|---|---|---|
| GW | N 0 | 2 | 1 5 : 0 5 | 1 | ・・・ | |
| N 6 | N 6 | 1 | 1 2 : 3 0 | 1 | ・・・ | |
| N 7 | N 5 | 2 | 1 1 : 3 0 | 1 | ・・・ | TO BE EXCLUDED |
| N 8 | N 5 | 2 | 1 1 : 4 0 | 1 | ・・・ | TO BE EXCLUDED |
CURRENT TIME=15:10, TIME THRESHOLD=THREE HOURS
NUMBER OF USES FOR NODE N4=NUMBER OF GDS THAT ARE NOT TO BE EXCLUDED=2
F I G. 1 0

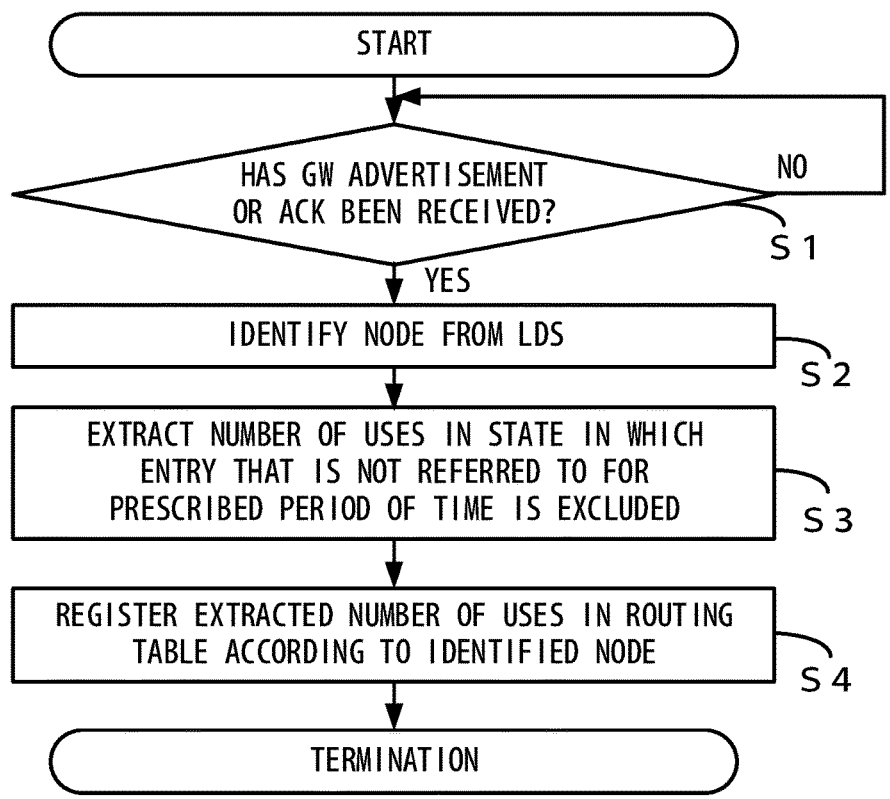
F I G. 1 1

EXAMPLE OF ROUTING TABLE OF NODE N5

| GD | LD | DISTANCE | USAGE TIME | TYPE OF DEVICE | NUMBER OF USES |
|---|---|---|---|---|---|
| GW | N 2 | 3 | ... | 1 | 3 |
| | N 3 | 3 | ... | 1 | 2 |
| | R 4 | 2 | ... | 2 | 3 |

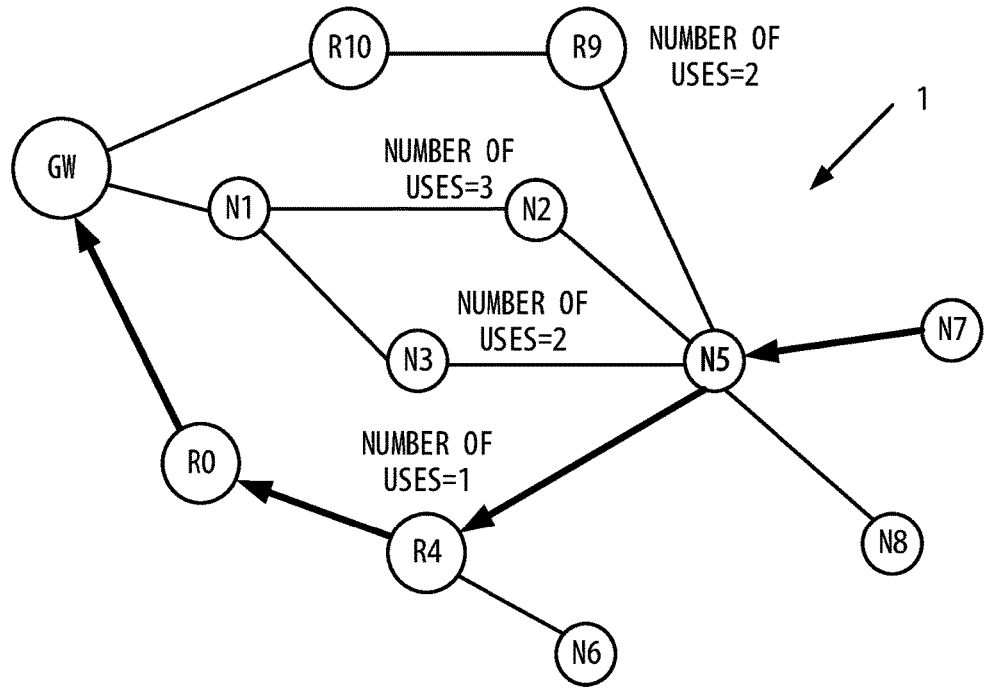
F I G. 1 5

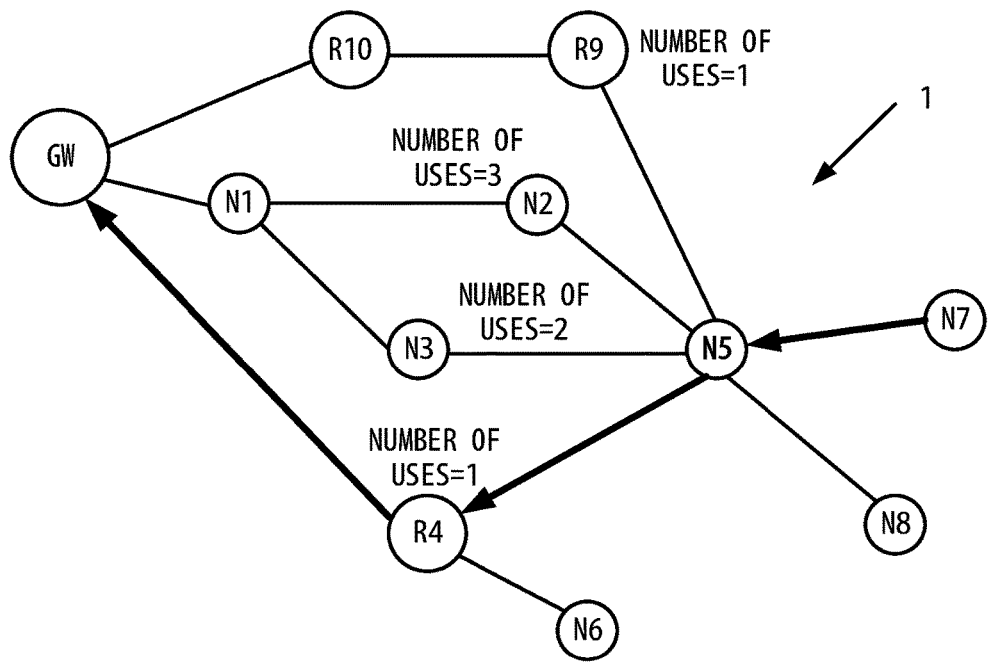
EXAMPLE OF ROUTING TABLE OF NODE N5
| G D | L D | DISTANCE | USAGE TIME | TYPE OF DEVICE | NUMBER OF USES |
|---|---|---|---|---|---|
| GW | N 2 | 3 | ... | 1 | 3 |
|  | N 3 | 3 | ... | 1 | 2 |
|  | R 4 | 1 | ... | 2 | 1 |
|  | R 9 | 2 | ... | 2 | 1 |
F I G. 1 6

TRANSFER DESTINATION SELECTING METHOD, COMMUNICATION DEVICE AND RECORDING MEDIUM

CROSS-REFERENCE TO RELATED APPLICATION

This application is based upon and claims the benefit of priority of the prior Chinese Patent Application No. 201510372898.X, filed on Jun. 30, 2015, the entire contents of which are incorporated herein by reference.

FIELD

The embodiments discussed herein are related to a transfer destination selecting method, a communication device and a recording medium.

BACKGROUND

In an ad-hoc network, nodes that join the network autonomously form a communication route, and data is transferred between adjacent nodes. Accordingly, data is transferred from a transmission source node that transmits the data up to a destination node.

As a related technology, a technology has been proposed that registers a transfer source and a transmission source of a frame in a registration table when the frame is received from a device that is not registered in a route information table, so as to use the transfer source and the transmission source as route information (see, for example, Patent Document 1).

Further, a technology has been proposed that distributes a traffic load on an integral part located upstream of a tree structure with a gateway at the top (see, for example, Patent Document 2).

Patent Document 1: International Publication Pamphlet No. WO 2012/133521
Patent Document 2: International Publication Pamphlet No. WO 2013/129671

SUMMARY

According to an aspect of the embodiments, a transfer destination selecting method conducted by a communication device includes selecting, when the communication device stores, according to a destination, pieces of information indicating a plurality of other communication devices that are candidates for a transfer destination of data, one of the other communication devices to be the transfer destination from among the candidates on the basis of a number of destinations in a routing table used for controlling a data transfer and stored in the plurality of other communication devices, respectively.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an ad-hoc network according to an embodiment;
FIG. 2 illustrates an example of a node;
FIG. 3 is a diagram (Part 1) that illustrates the ad-hoc network according to the embodiment and an example of a routing table;
FIG. 4 is a diagram (Part 2) that illustrates the ad-hoc network according to the embodiment and an example of the routing table;
FIG. 7 is a diagram (Part 2) that illustrates an example of the report about the number of uses;
FIG. 8 is a diagram (Part 4) that illustrates the ad-hoc network according to the embodiment and an example of the routing table;
FIG. 9 illustrates an example of a data frame;
FIG. 10 is a diagram (Part 5) that illustrates the ad-hoc network according to the embodiment and an example of the routing table;
FIG. 11 is a flowchart (Part 1) that illustrates an example of a flow of processing according to the embodiment;
FIG. 15 is a diagram (Part 2) that illustrates a variation of the ad-hoc network and an example of the routing table;
FIG. 16 is a diagram (Part 3) that illustrates a variation of the ad-hoc network and an example of the routing table.

DESCRIPTION OF EMBODIMENTS

Figure 5:
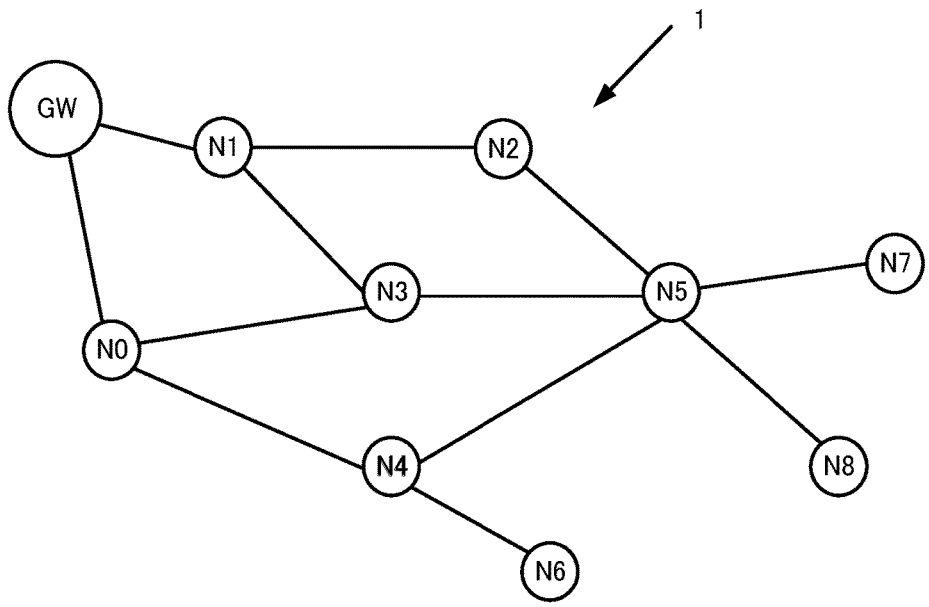
FIG. 5 is a diagram (Part 3) that illustrates the ad-hoc network according to the embodiment and an example of the routing table.

In an ad-hoc network, a communication route is formed autonomously. There is a possibility that a communication load will be concentrated on a specific node depending on the network configuration or the communication state in the ad-hoc network.

<Example of Ad-hoc Network According to Embodiments>

FIG. 1 illustrates an example of an ad-hoc network 1 according to an embodiment. The ad-hoc network 1 is not limited to the example of FIG. 1. A gateway GW and sensor nodes N0 to N8 join the ad-hoc network 1 of FIG. 1. The sensor nodes N0 to N8 may be collectively referred to as a sensor node N.

The sensor node N is, for example, a node that measures a power or a temperature and transmits a measurement value. In the embodiment, it is assumed that each sensor node N transmits a measurement value to the gateway GW. A node other than the sensor node N may join the ad-hoc network 1.

For example, a node for relaying a data transfer (hereinafter referred to as a relay node R) may join the ad-hoc network 1. Further, any node other than the sensor node N and the relay node R may join the ad-hoc network 1. An example in which the relay node R joins the ad-hoc network 1 will be described later.

The sensor node N and the relay node R may hereinafter be collectively referred to as a node. The node is an example of a communication device. Further, a node adjacent to a certain node is an example of another communication device.

A censor node N communicates with another sensor node N that is adjacent to the censor node N (hereinafter referred to as an adjacent sensor node N). The communication performed between two sensor nodes N that are adjacent to each other may be a radio communication or may be a wire communication.

FIG. 1 illustrates an example in which the number of sensor nodes N is nine, but there may be any number of sensor nodes N. For example, the ad-hoc network 1 may include a thousand or more nodes.

In the example of FIG. 1, "distance" is notated near each sensor node N. The distance of each sensor node N indicates the number of nodes originating from the gateway GW up to the sensor node N. For example, the sensor node N1 is adjacent to the gateway GW, so its distance is "1".

Further, there exists the sensor node N0 or the sensor node N1 on the communication route between the sensor node N3 and the gateway GW, so the distance of the sensor node N3 is "2".

For example, when there is another sensor node N between the sensor node N0 and the sensor node N3, the distance of the sensor node N3 with respect to the communication route through the sensor node N0 is "3". Further, the distance of the sensor node N3 with respect to the communication route through the sensor node N1 is "2".

The number obtained by subtracting "1" from a distance of each sensor node N indicates the number of times that data is transferred (the number of transfers). For example, when data is transferred from the sensor node N5 to the gateway GW, the sensor node N3 and the sensor node N1 (or the sensor node N0) perform a data transfer, so the number of transfers is two.

For example, the gateway GW broadcasts a gateway advertisement to each sensor node N. The gateway advertisement is data for the gateway GW to report its existence to each node that joins the ad-hoc network 1. The gateway GW may transmit a gateway advertisement that is to be reported within a limited range.

When receiving a gateway advertisement, each sensor node N stores information on a distance in a routing table. The routing table is a table that is used for controlling a data transfer. The routing table is also referred to as a route information table.

<Example of Each Node>

FIG. 2 illustrates an example of a node. The node includes a communication unit 11, a processing unit 12, a storage 13, a random number generator 14, a selector 15, and a clock unit 16. The node may be a sensor node N or a relay node R.

The sensor node N and the relay node R may include a function other than the components of FIG. 2. For example, the sensor node N may incorporate therein a sensor that measures a power or a temperature.

The communication unit 11 communicates with an adjacent sensor node N. For example, when the sensor node N performs a radio communication, a communication unit 11 of the sensor node N communicates directly with a communication unit 11 of the adjacent sensor node N. Thus, the sensor node N and the adjacent sensor node N are installed within a range in which radio waves from each other are able to reach.

The processing unit 12 performs prescribed processing on the basis of data received by the communication unit 11. The storage 13 stores therein a routing table and a time threshold.

The time threshold is a threshold that serves as a baseline when times indicated by the clock unit 16 are compared. The storage 13 may store therein information other than a routing table. The random number generator 14 generates a random number.

The selector 15 selects, according to a destination of the data received by the communication unit 11, a sensor node N that is a transfer destination of the data. The selector 15 refers to the routing table stored in the storage 13 and selects a transfer destination of the data.

In the ad-hoc network 1, the destination of data indicates a node that is a final destination of the data. The destination of data indicates a node to which a certain node transfers data subsequently. Thus, when the certain node is set to be a base, the transfer destination of the data is a node that is adjacent to the certain node.

It is hereinafter assumed that the destination of data is the gateway GW. However, the destination of data may be any sensor node N. There may be one or a plurality of communication routes from a sensor node N to the gateway GW.

When a certain sensor node has a plurality of communication routes up to the gateway GW that is the destination, there are a plurality of candidate sensor nodes N to which data is to be transferred by the certain sensor node N (adjacent sensor nodes N). When there are a plurality of candidates for a transfer destination of data, the selector 15 selects one sensor node N from among the plurality of candidates for a destination. The clock unit 16 presents a current time.

<Example of Number of Uses for Node>

Next, the number of uses for a node is notated with reference to FIG. 3. FIG. 3 illustrates the ad-hoc network 1 of FIG. 1 and an example of a routing table of the sensor node N2 which joins the ad-hoc network 1.

Each sensor node N performs data communication with an adjacent sensor node N. Each sensor node N may update its routing table on the basis of the information included in data received from the adjacent sensor node N. For example, when the sensor node N2 receives data from the sensor node N1, the sensor node N2 may update the routing table on the basis of the information included in received data.

It is assumed that routing tables of the respective sensor nodes N of and after FIG. 3 are routing tables that have been updated as a result of performing the following six data communications:
1) Data communication from the sensor node N6 to the gateway GW
2) Data communication from the sensor node N7 to the gateway GW
3) Data communication from the sensor node N8 to the gateway GW
4) Data communication from the gateway GW to the sensor node N6
5) Data communication from the gateway GW to the sensor node N7
6) Data communication from the gateway GW to the sensor node N8

As illustrated in the example of FIG. 3, the routing table includes items such as a global destination (GD), an local destination (LD), a distance, a usage time, a type of device, and a number of uses. The routing table may include an item of other information.

The GD indicates an address of a sensor node N that is a destination of data. The GD registered in the routing table may be referred to as an entry. The number of GDs registered in the routing table (the number of entries) is an example of the number of destinations.

As described above, data communications are performed between the sensor node N7 and the gateway GW, and between the sensor node N8 and the gateway GW. In the example of FIG. 3, the GDs are the gateway GW, the sensor node N7, and the sensor node N8 in the routing table of the sensor node N2.

The local destination (LD) indicates an address of a transfer-destination sensor node N on a communication route through which data is to be transferred to the GD. In the example of the routing table of FIG. 3, the LD in an entry in which the GD is the gateway GW is the sensor node N1.

The distance in the routing table is the distance described above. With respect to the sensor node N2, the distance up to the gateway GW that is a GD is "2". In this case, the number of transfers of data from the sensor node N2 up to the gateway GW is "1".

The usage time indicates the time at which each entry was referred to the last time. The selector 15 of the sensor node N refers to the routing table so as to control a data transfer. For example, when the sensor node N2 transfers data to the gateway GW, a selector 15 of the sensor node N2 refers to an entry, in the routing table, in which the GD is the gateway GW.

When the selector 15 refers to the entry, the selector 15 registers a current time presented by the clock unit 16 in the routing table as a corresponding usage time of the referred to entry. Accordingly, the time at which the entry was referred to is registered in the entry in the routing table.

In the example of FIG. 3, "14:30" is the usage time in the entry in which the GD is the gateway GW in the routing table of the sensor node N2. Thus, the time at which the selector 15 referred to the entry last time is "14:30".

The type of device refers to information that indicates types of nodes that are described as the LDs (information on a type of device). The information on a type of device is also referred to as a device address.

For example, the node is a sensor node N or a relay node R. In this case, the sensor node N and the relay node R are different from each other in type of device. The sensor node N is a communication device that transmits a value obtained by measuring a power or a temperature, and often has a lower throughput of communication than that of the relay node R intended for performing communication.

In the embodiment, the type of device of the sensor node N is "1", and the type of device of the relay node R is "2". There may be three or more types of devices. For example, when there are a plurality of types of relay nodes, pieces of information on types of device of the plurality of types of relay nodes may be different from one another according to the throughput of communication.

For example, each sensor node N may mutually communicate with an adjacent sensor node N, recognize a type of device of the adjacent sensor node N, and register the type of device of the adjacent sensor node N in a routing table. Further, when the type of device of the adjacent sensor node N is known, the type of device of the adjacent sensor node N may be registered, in advance, in the routing table of each sensor node N.

Next, the number of uses is described. The number of uses is the number of entries obtained by excluding, from the entries in the routing table of the sensor node N, an entry that is not referred to for a prescribed period of time or longer (the number of destinations). The prescribed period of time is a time threshold which the storage 13 stores therein. It is hereinafter assumed that the prescribed period of time (time threshold) is three hours.

In the embodiment, the number of uses is used for the selector 15 of the sensor node N selecting a transfer destination of data. For example, it is assumed that time (current time) presented by the clock unit 16 is "15:00", as illustrated in the example of FIG. 3. In this case, in the routing table, an entry (GD) in which a time before "12:00" is notated as the usage time is not referred to for the prescribed period of time or longer.

An entry that is not referred to for the prescribed period of time or longer is to be excluded. On the other hand, in the routing table, an entry (GD) in which a time after "12:00" is notated as the usage time is referred to between the current time and the prescribed period of time ago. An entry that was referred to between the current time and the prescribed period of time ago is not to be excluded.

In the example of FIG. 3, all of the usage times in the three entries registered in the routing table are times after "12:00". Thus, the three entries registered in the routing table in the example of FIG. 3 are not to be excluded.

Thus, in the routing table of the sensor node N2, there does not exist any entry that is not referred to for the prescribed period of time or longer. As a result, there is no entry to be excluded, so the number of uses for the sensor node N2 is "3". In this case, the number of uses is the same as the number of entries, in the routing table, in which the GD is the gateway GW.

The number of uses registered in the routing table corresponds to the LD. The number of uses in the routing table indicates the number of uses for a corresponding LD. For example, in the example of FIG. 3, the number of uses for the sensor node N1 and the number of uses for the sensor node N5 are registered in the routing table of the sensor node N2.

Next, the number of uses for the sensor node N3 is described with reference to FIG. 4. FIG. 4 illustrates the ad-hoc network 1 of FIG. 1 and an example of a routing table of the sensor node N3 which joins the ad-hoc network 1.

In the ad-hoc network 1 in the example of FIG. 4, there are a communication route through the sensor node N0 and a communication route through the sensor node N1 as a communication route from the sensor node N3 up to the gateway GW.

Thus, in the routing table of the sensor node N3, two LDs, the sensor node N0 and the sensor node N1, are registered in an entry in which the GD is the gateway GW. In this case, a plurality of LDs are registered in one entry.

In the example of FIG. 4, the usage times in entries, in the routing table of the sensor node N3, in which the GDs are the gateway GW and the sensor node N8 are times after "12:00". Thus, these entries are not to be excluded.

On the other hand, the usage time in an entry, in the routing table of the sensor node N3, in which the GD is the sensor node N7 is "11:30", which is a time before "12:00". Thus, this entry is to be excluded. In FIG. 4 onwards, an entry to be excluded is depicted by shading in each corresponding figure.

The number of entries in the routing table of the sensor node N3 is "3". Further, one entry is to be excluded. Thus, the number of uses for the sensor node N3 is "2", which is obtained by subtracting the number of entries to be excluded from the number of entries in the routing table.

Each sensor node N refers to a routing table so as to control a data transfer. Thus, a transfer of data whose destination is a GD in an entry that is not referred to for a long period of time is not performed for a long period of time.

For example, in the example of FIG. 4, an entry, in the routing table of the sensor node N3, in which the GD is the sensor node N7 is not referred to for the prescribed period of time or longer. Thus, the sensor node N3 does not perform a transfer of data whose destination is the sensor node N7 for a long period of time.

Thus, when the current time is a baseline, it is presumed that the sensor node N3 is less likely to perform a transfer of data whose destination is the sensor node N7. Thus, in the example of FIG. 4, it is presumed that there are two destinations, the gateway GW and the sensor node N8, for a data transfer which the sensor node N3 is more likely to perform.

The number of uses in the embodiment refers to the number of destinations for which the sensor node N is more likely to perform a data transfer. The number of uses for the sensor node N2 is "3". The number of uses for the sensor node N3 is "2". Thus, the number of destinations for which the sensor node N3 is more likely to perform a data transfer is fewer than that of the sensor node N2. In this case, it is presumed that the sensor node N3 is under a communication load that is lighter than the sensor node N2.

Next, the number of uses for the sensor node N4 is described with reference to FIG. 5. FIG. 5 illustrates the ad-hoc network 1 of FIG. 1 and an example of a routing table of the sensor node N4 which joins the ad-hoc network 1.

In the example of FIG. 5, four entries in which the GDs are the gateway GW, the sensor node N6, the sensor node N7, and the sensor node N8 are registered in the routing table of the sensor node N4. From among them, the usage time in the entry in which the GD is the sensor node N6 is "12:30", which is a time after "12:00".

Thus, the entry of the sensor node N6 in the routing table is not to be excluded. On the other hand, the usage times in the entries in which the GDs are the gateway GW, the sensor node N7, and the sensor node N8 are times before "12:00", which is the time corresponding to the time threshold before the current time. Thus, these entries are to be excluded because they are not referred to for the prescribed period of time or longer.

Thus, the number of uses for the sensor node N4 is "1" because three entries are excluded from the four entries. As described above, the number of uses for the sensor node N2 is "3", and the number of uses for the sensor node N3 is "2".

As a result, from among the sensor node N2, the sensor node N3, and the sensor node N4, the number of uses for the sensor node N4 is fewest. In other words, it is presumed that a sensor node N that is under a lightest communication load from among the sensor node N2, the sensor node N3, and the sensor node N4 is the sensor node N4.

<Example of Report About Number of Uses>

Figure 6:
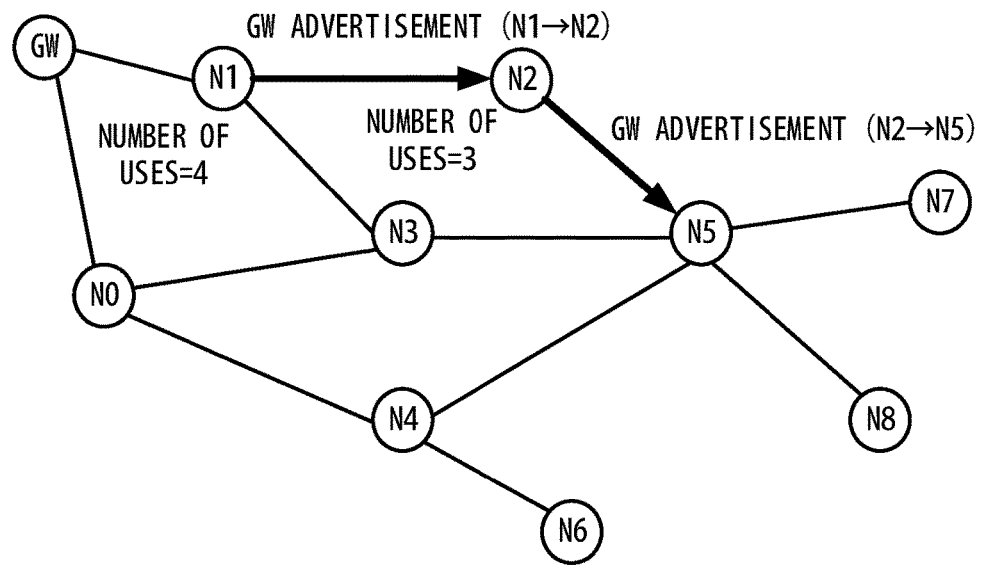
FIG. 6 is a diagram (Part 1) that illustrates an example of a report about the number of uses.

Next, a report about the number of uses is described. FIG. 6 illustrates an example in which each sensor node N reports the number of uses to an adjacent sensor node N by use of a gateway advertisement. The gateway advertisement is an example of data to be transmitted from a gateway. An arrow illustrated in FIG. 6 indicates a gateway advertisement to be transferred.

In the example of FIG. 6, the gateway advertisement is data that includes pieces of information on an LD, an LS, a GD, a GS, a distance, the number of uses, and data to be transmitted. The LD is the local destination described above. The local source (LS) indicates an address of a transfer-source sensor node N when a data frame is transferred.

The GD is the global destination described above. The global source (GS) indicates an address of a sensor node N that generates data. The distance indicates a distance from the gateway GW up to a sensor node N. The number of uses indicates the number of uses for a sensor node N. The data to be transmitted is prescribed information included in a gateway advertisement.

For example, the gateway GW broadcasts a gateway advertisement. A communication unit 11 of the sensor node N1 receives the gateway advertisement. When the sensor node N1 transfers the gateway advertisement to the sensor node N2, a processing unit 12 of the sensor node N1 rewrites the LS in the gateway advertisement with the sensor node N1.

Further, the processing unit 12 rewrites the number of uses in the gateway advertisement with the number of uses for the sensor node N1 (=4) and increments the distance in the gateway advertisement. The sensor node N1 is adjacent to the gateway GW, so the distance in the gateway advertisement received by the sensor node N1 from the gateway GW is zero. Thus, the processing unit 12 increments the distance in the gateway advertisement so that the distance in the gateway advertisement becomes "1".

The communication unit 11 of the sensor node N1 transfers, to the sensor node N2, the gateway advertisement in which the information has been rewritten by the processing unit 12. A communication unit 11 of the sensor node N2 receives the transferred gateway advertisement.

A processing unit 12 of the sensor node N2 registers, in a routing table, the number of uses for the sensor node N1 (=4) that is included in the gateway advertisement. Further, the processing unit 12 rewrites the content of the gateway advertisement.

The communication unit 11 of the sensor node N2 transfers, to the sensor node N5, the gateway advertisement in which the information has been rewritten. A communication unit 11 of the sensor node N5 receives the gateway advertisement transmitted from the sensor node N2. A processing unit 12 of the sensor node N5 registers, in a routing table, the number of uses for the sensor node N2 (=3) that is included in the gateway advertisement.

As illustrated in the example of FIG. 6, the gateway advertisement is data to be broadcast, so the LD is not designated.

Next, referring to the example of FIG. 7, an example in which the number of uses is reported by use of an acknowledgement signal (ACK) is described. It is assumed that the sensor node N0 transmits data (hereinafter referred to as a data frame) to the sensor node N4. When it receives the data frame, the sensor node N4 transmits, to the sensor node N0, an ACK indicating that it has received a data frame.

In the example of FIG. 7, a dashed arrow indicates a data frame transmitted from the sensor node N0 to the sensor node N4, and a solid arrow indicates an ACK.

A processing unit 12 of the sensor node N4 includes the number of uses (=1) in the ACK to be transmitted to the sensor node N0. A communication unit 11 of the sensor node N4 transmits the ACK to the sensor node N0. A communication unit 11 of the sensor node N0 receives the ACK. A communication unit 12 of the sensor node N0 registers, in a routing table, the number of uses for the sensor node N4 (=1) that is included in the ACK.

<Example of Route Selection Based on Number of Uses>

Next, referring to the example of FIG. 8, an example of a route selection based on the number of uses is described. FIG. 8 illustrates an example in which the sensor node N7 transmits a data frame whose destination is the gateway GW. A processing unit 12 of the sensor node N7 generates a data frame to be transmitted. Arrows in the ad-hoc network 1 of FIG. 8 indicate a communication route through which the data frame is transferred.

FIG. 9 illustrates an example of a data frame. The data frame in the example of FIG. 9 includes items such as an LD, an LS, a GD, a GS, and data to be transmitted. The data frame may include other information. For example, the data frame may include, for example, information that guarantees the validity of the data frame and information on a length of the data frame.

Only the sensor node N5 is adjacent to the sensor node N7. Thus, the processing unit 12 of the sensor node N7 generates a data frame that indicates the sensor node N5 to be the LD, the sensor node N7 to be the LS, the gateway GW to be the GD, and the sensor node N7 to be the GS.

As illustrated in FIG. 8, the sensor node N7 transfers the data frame to the sensor node N5. The communication unit 11 of the sensor node N5 receives the data frame transferred from the sensor node N7. A selector 15 of the sensor node N5 refers to the GD in the received data frame so as to recognize that the GD in the data frame is the gateway GW.

The selector 15 refers, in a routing table stored in the storage 13, to an entry in which the GD is the gateway GW. As illustrated in the example of FIG. 8, the entry of the GD includes three LDs.

When the sensor node N5 transfers a data frame whose destination is the gateway GW, the sensor node N2, the sensor node N3, and the sensor node N4 that are the three LDs included in the entry of the GD registered in the routing table are candidates for a next transfer destination.

The selector 15 selects a sensor node N having a fewest number of uses from among the candidates for a transfer destination of the data frame. In the example of FIG. 8, the number of uses for the sensor node N4 is fewest. Thus, the selector 15 selects the sensor node N4 from among the candidates for a transfer destination.

The communication unit 11 of the sensor node N5 transfers the data frame to the sensor node N4 selected by the selector 15. The data frame is transferred to the sensor node N4, and after that, it is transferred to the sensor node N0. Then, the data frame is transferred from the sensor node N0 to the gateway GW.

When there are a plurality of candidates for a transfer destination of the data frame, the selector 15 of the sensor node N5 selects a transfer destination of the data frame on the basis of the number of uses for each candidate. As described above, the sensor node N4 having a fewer number of uses is presumed to be under a lighter communication load, and the sensor node N2 having a larger number of uses is presumed to be under a heavier communication load.

When the data frame is transferred to the sensor node N2 that is under a heavy communication load, there is a possibility that the sensor node N2 will be under a much heavier communication load. In this case, for example, there is a possibility that, for example, an increase in power consumption or a pressure on a bandwidth will occur in the sensor node N2. Thus, a concentration of a communication load on a specific node is not preferable.

Then, the selector 15 of the sensor node N5 selects the sensor node N4 that is presumed to be under a light communication load as a transfer destination of the data frame. The selector 15 of each sensor node N that joins the ad-hoc network 1 selects a sensor node N having a fewest number of uses as a transfer destination of a data frame, which results in distributing a communication load.

In the example of FIG. 8, the communication unit 11 of the sensor node N5 transfers the data frame to the sensor node N4 selected by the selector 15. A selector 15 of the sensor node N4 refers, in a routing table, to an entry in which the GD is the gateway GW.

The selector 15 of the sensor node N4 registers a time presented by a clock unit 16 of the sensor node N4 as a usage time in an entry, in the routing table, in which the GD is the gateway GW. It is assumed that, as illustrated in the example of FIG. 10, the registered usage time is "15:05".

Before the usage time was newly registered, the entry in which the GD is the gateway GW in the routing table of the sensor node N4 was not referred to for the prescribed period of time or longer, so the entry was to be excluded.

When the usage time is newly registered, in the routing table of the sensor node N4, the entry in which the GD is the gateway GW was referred to between the current time and the prescribed period of time ago. Thus, this entry is now not to be excluded. As a result, the number of uses for the sensor node N4 is "2".

Accordingly, when the selector 15 of the sensor node N5 selects, from among the candidates for a transfer destination, the sensor node N4 having a fewest number of uses as a transfer destination, the number of uses for the sensor node N4 selected to be a transfer destination increases by one. Thus, the number of uses for a candidate for a transfer destination changes every time the sensor node N5 transfers a data frame.

Therefore, a sensor node N selected by the selector 15 of the sensor node N5 changes. In other words, the sensor node N5 transfers, according to an actual communication state, a data frame to a sensor node N that is presumed to be under a light communication load, so there is no possibility of any concentration of a communication load on a specific sensor node N. This results in distribution of a communication load.

In the example described above, the selector 15 of a sensor node N selects a transfer destination on the basis of the number of uses for a candidate for a transfer destination. The number of uses is the number of entries obtained by excluding, from the entries in a routing table of a candidate for a transfer destination (the number of destinations), an entry that is not referred to for a prescribed period of time or longer.

The selector 15 of the sensor node N may select a transfer destination on the basis of the number of entries for a candidate for a transfer destination (the number of destinations). In this case, the selector 15 of the sensor node N selects a transfer destination on the basis of the number of entries in a state in which any entry is not excluded. Then, the selector 15 of the sensor node N transfers a data frame to another sensor node N having a fewest number of entries from among the candidates for a transfer destination.

The number of entries for a candidate for a transfer destination to which a sensor node N transfers a data frame may change according to various factors. For example, the sensor node N may delete an entry from a routing table due to a communication failure.

Further, when a new sensor node N joins the ad-hoc network 1, a new entry may be added to a routing table of the sensor node N. Thus, the number of entries for a candidate for a transfer destination (the number of destinations) to which the sensor node N transfers a data frame changes, so there is no possibility of any concentration of a communication load on a specific sensor node N. This results in distribution of a communication load.

<Flowchart of Embodiment>

Next, flowcharts that illustrate examples of flows of processing according to the embodiment are described. First, a flow of a sensor node N performing processing of registering the number of uses for an adjacent sensor node N in a routing table is described with reference to FIG. 11. The processing of FIG. 11 is performed by each sensor node N.

When a certain sensor node N does not receive a gateway advertisement or an ACK (N0 in Step S1), the process does not move onto the next step. When the certain sensor node N receives a gateway advertisement or an ACK (YES in Step S1), the processing unit 12 identifies a sensor node N from among the LDs that are included in the received gateway advertisement or the received ACK (Step S2).

The processing unit 12 extracts the number of uses from the received gateway advertisement or the received ACK (Step S3). The extracted number of uses is the number of entries obtained by excluding, from the entries in a routing table of the certain sensor node N, an entry that is not referred to for a prescribed period of time.

The processing unit 12 registers the extracted number of uses in the routing table according to the identified sensor node N (Step S4). Accordingly, the number of uses for an adjacent sensor node N that has transmitted the gateway advertisement or the ACK is registered in the routing table of the certain sensor node N.

Figure 12:
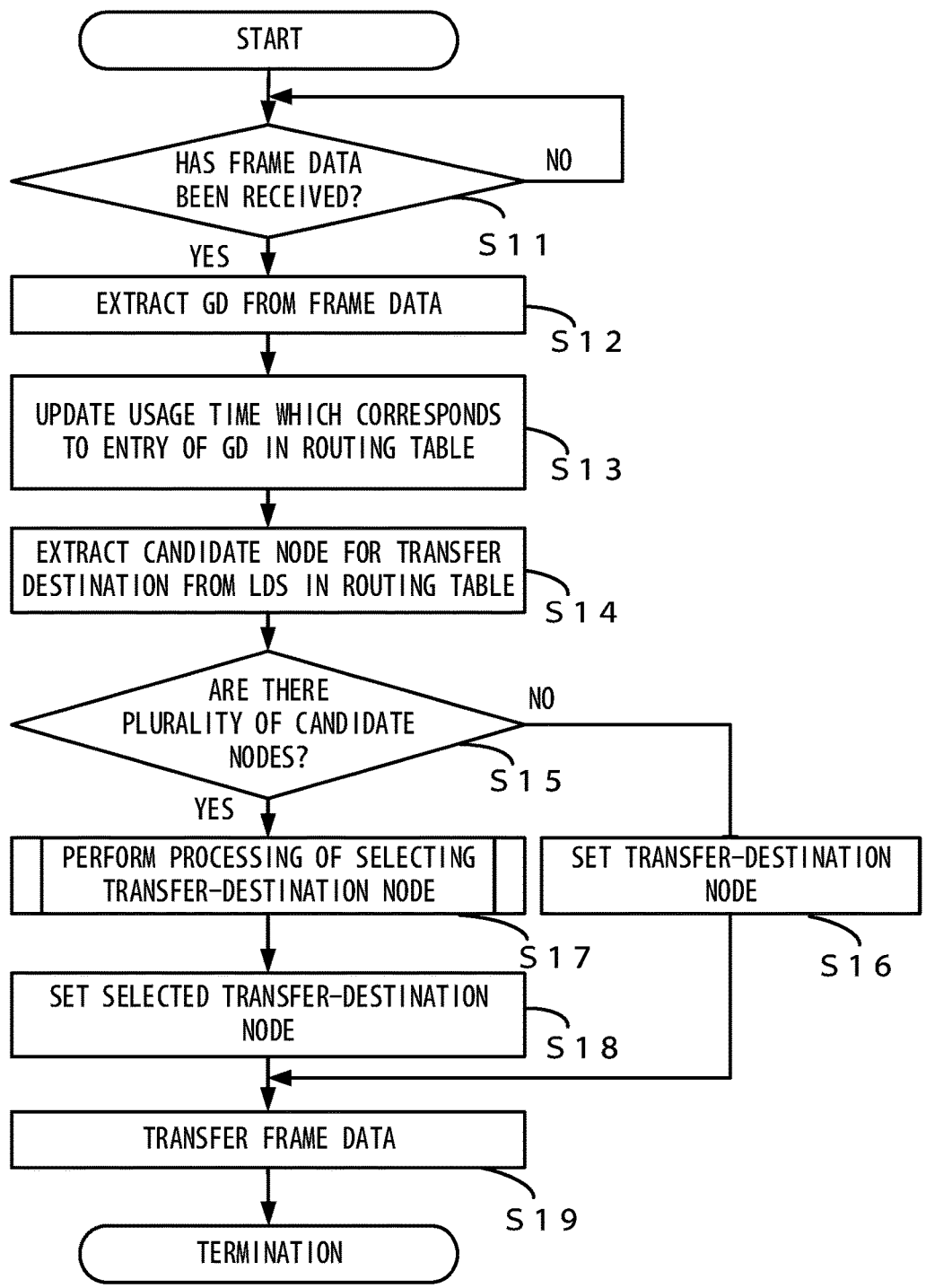
FIG. 12 is a flowchart (Part 2) that illustrates an example of a flow of processing according to the embodiment.

Next, processing of transferring a data frame is described with reference to the flowchart of FIG. 12. The processing of FIG. 12 is performed by each sensor node N.

When a communication unit 11 of the certain sensor node N does not receive a data frame (NO in Step S11), the certain sensor node N does not perform a transfer of a data frame. In this case, the process does not move on to the next step.

When the communication unit 11 of the certain sensor node N receives a data frame (YES in Step S11), a selector 15 of the certain sensor node N extracts a sensor node N that is described as the GD in the received data frame (Step S12).

In the routing table, the selector 15 updates the usage time in an entry which corresponds to the extracted GD (Step S13). In the routing table, the selector 15 extracts a candidate sensor node N for a transfer destination from the LDs in an entry which corresponds to the GD in the data frame (Step S14).

In the routing table, the number of LDs in the entry corresponding to the GD in the data frame may be one or plural. When there is one LD in the entry corresponding to the GD, the number of candidate sensor nodes N for a transfer destination is one. When there are a plurality of LDs in the entry corresponding to the GD, the number of candidates for a transfer destination is plural.

When there is one candidate for a transfer destination (NO in Step S15), the selector 15 selects the extracted transfer-destination sensor node N. The processing unit 12 sets the transfer-destination sensor node N selected by the selector 15 to the LD of the data frame to be transferred (Step S16).

On the other hand, when there are a plurality of candidate sensor nodes N for a transfer destination (YES in Step 15), the selector 15 performs processing of selecting a transfer-destination sensor node N from among the plurality of candidates (Step S17). The processing unit 12 sets the transfer-destination sensor node N selected by the selector 15 to the LD of the data frame to be transferred (Step S18).

The communication unit 11 transfers the data frame to the set sensor node N described as the LD (Step S19). Then, the processing is terminated. The processing described above is performed every time the communication unit 11 receives a data frame.

Figure 13:
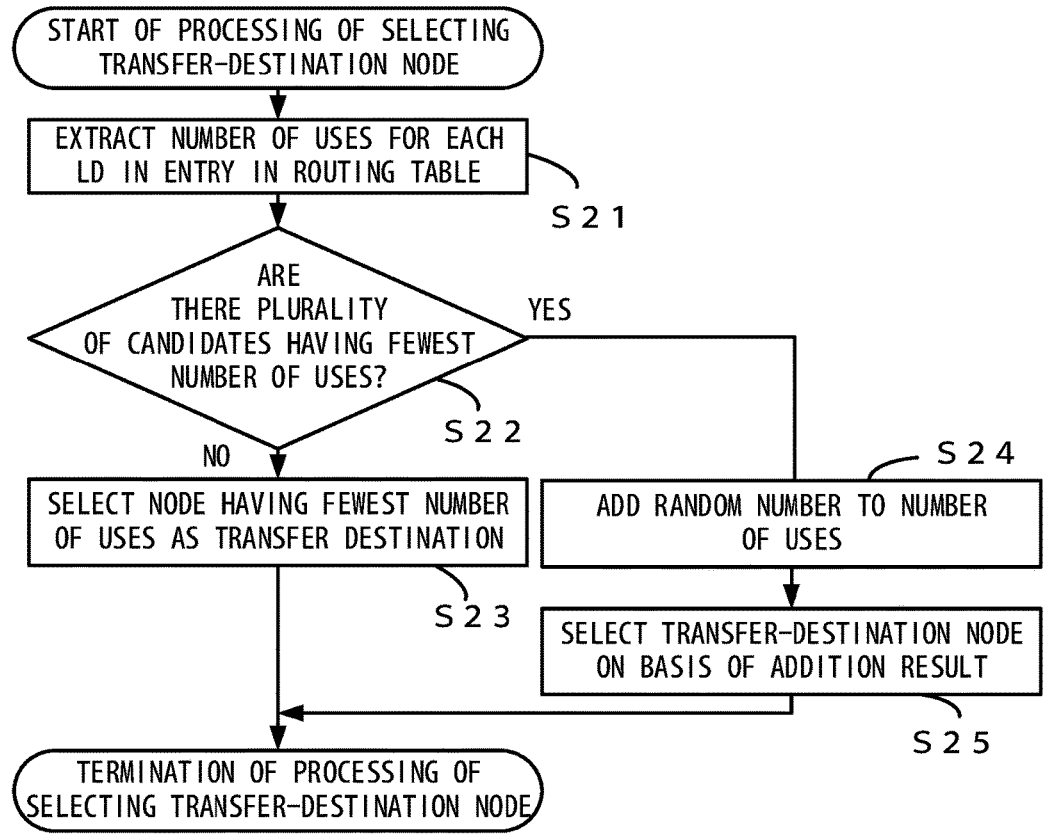
FIG. 13 is a flowchart (Part 3) that illustrates an example of a flow of processing according to the embodiment.

Next, the processing of selecting a transfer-destination node in Step S17 is described with reference to the flowchart of FIG. 13. In the routing table, the selector 15 of the certain sensor node N extracts the number of uses for each of the LDs in the entry that corresponds to a destination (GD) of the data frame received by the communication unit 11 (Step S21). Each of the extracted LDs is a candidate transfer destination of the data frame.

When there is one sensor node N having a fewest number of uses from among the LDs in the entry that corresponds to the destination (GD) of the data frame (NO in Step S22), the candidate destinations to which the data frame is to be transferred are narrowed down to one. The selector 15 selects a sensor node N having a fewest number of uses as a transfer destination (Step S23).

When there are a plurality of sensor nodes N having a fewest number of uses from among the LDs in an entry that corresponds to the destination (GD) of the data frame (YES in Step S22), the candidates for a transfer destination of the data frame are not narrowed down to one.

In this case, the selector 15 adds a random number generated by the random number generator 14 to the number of uses for a sensor node N that is a candidate for selection (Step S24). Then, differences occur between the numbers of uses for the sensor nodes N that are candidates for selection, which results in narrowing down the sensor nodes N for a transfer destination of the data frame to one.

In Step S24, with respect to the number of uses for each candidate, the selector 15 may perform subtraction or addition of the random number generated by the random number generator 14, or may perform division by it. The selector 15 may perform any operation using the random number with respect to the number of uses for each candidate.

The selector 15 selects, on the basis of a result of the addition of the random number to the number of uses, a sensor node N having a fewest number of uses as a transfer destination (Step S25). When the process of Step S23 or Step S25 is performed, the processing of selecting a transfer-destination node is terminated.

<Variations>

Next, variations are described. The sensor node N5 is adjacent to a relay node R4 in the ad-hoc network 1 in the example of FIG. 14. Further, the relay node R4 is adjacent to a relay node R0.

Figure 14:
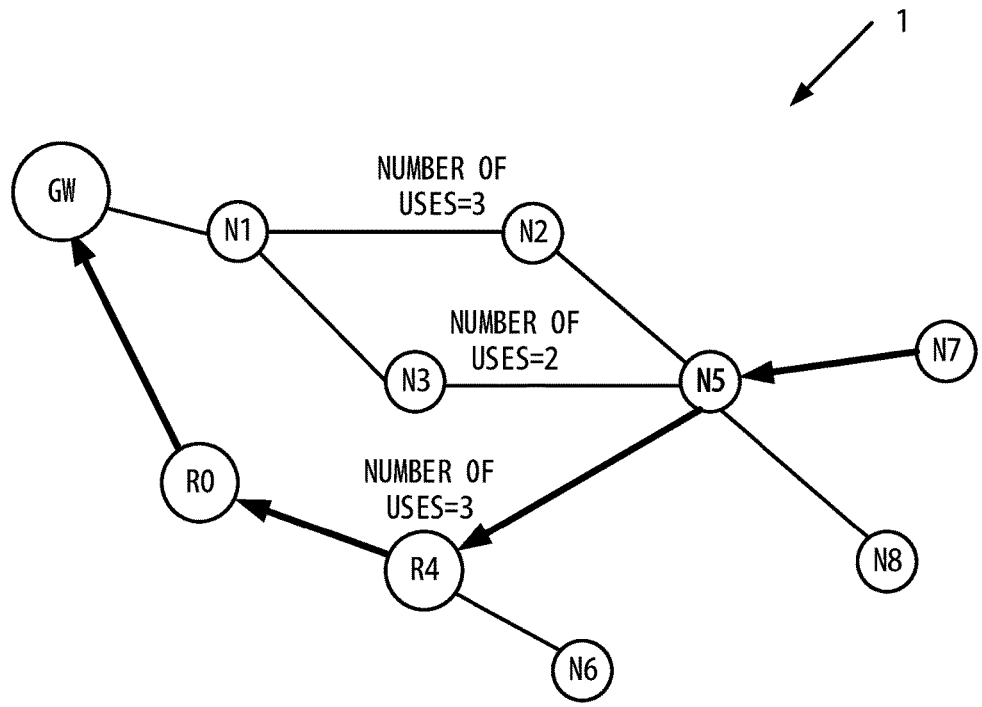
FIG. 14 is a diagram (Part 1) that illustrates a variation of the ad-hoc network and an example of the routing table.
Figure 17:
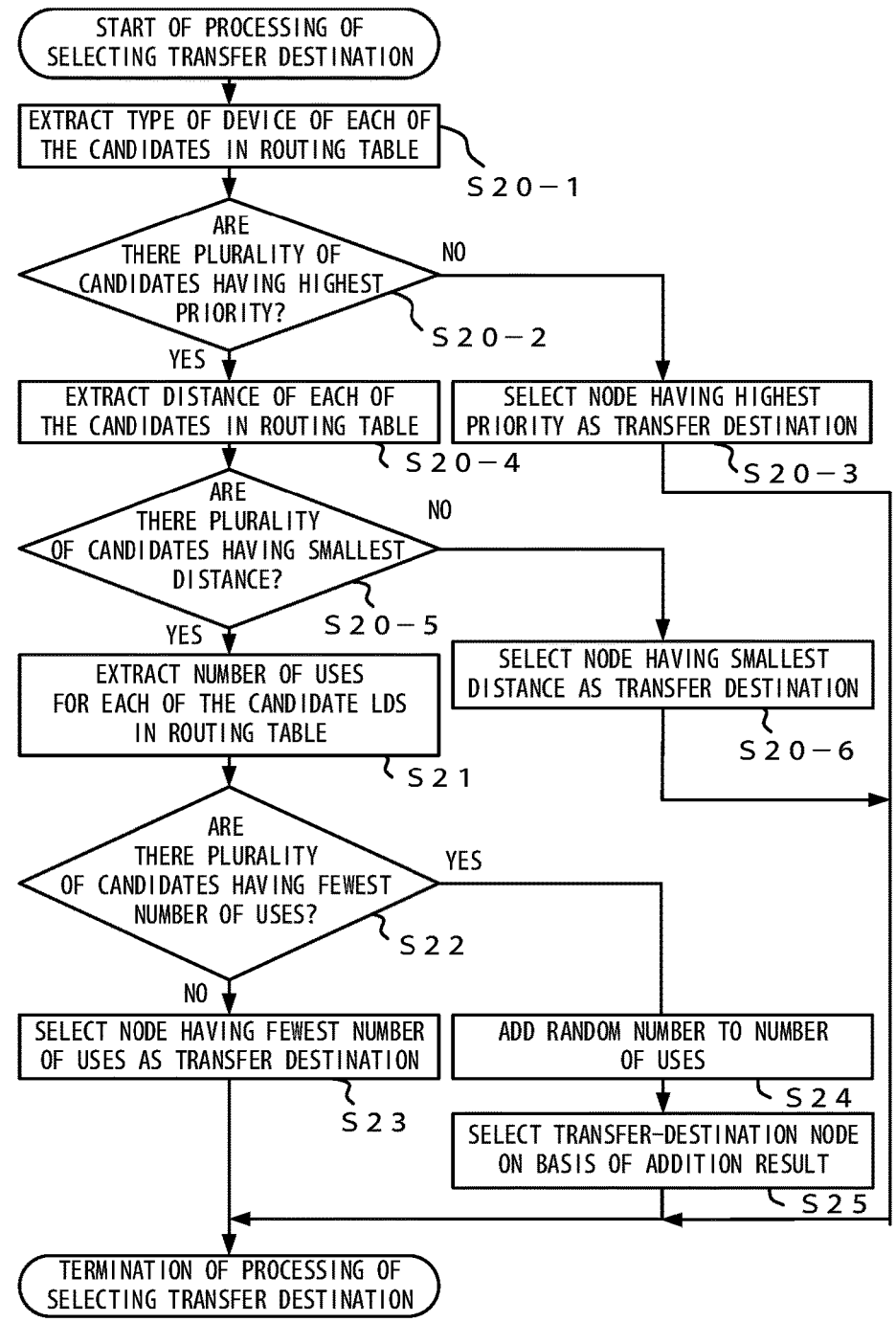
FIG. 17 is a flowchart that illustrates an example of a flow of processing according to the variations.

As described above, the relay node R0 and the relay node R4 often have a higher throughput of communication than that of a sensor node N. In the example of FIG. 14, it is assumed that the sensor node N7 transfers a data frame whose destination is the gateway GW to the sensor node N5.

The selector 15 of the sensor node N5 refers to a routing table and extracts each of the LDs in an entry in which the GD is the gateway GW. The selector 15 of the sensor node N5 selects, in the routing table, a transfer destination of the data frame on the basis of the type of device corresponding to each of the extracted LDs.

As a candidate for a transfer destination, there are three nodes, the sensor node N2, the sensor node N3, and the relay node R4. The selector 15 selects a node having a type of device that has a highest priority from among the types of devices. It is assumed that a node having a type of device that has a higher throughput of communication has a higher priority and a node having a type of device that has a lower throughput of communication has a lower priority.

It is assumed that the priority of a type of device is represented by a numerical value. It is also assumed that the priority of a type of device is higher if the numerical value is higher and the priority of a type of device is lower if the numerical value is lower. In the example of FIG. 14, the priority of the relay node R4 is highest, so the selector 15 selects the relay node R4.

When the selector 15 selects the relay node R4 as a transfer destination of the data frame, the communication unit 11 transfers the data frame to the relay node R4. The relay node R4 transfers the data frame to the relay node R0, and the relay node R0 transfers the data frame to the gateway GW.

In the example of FIG. 14, in the routing table of the sensor node N5, a node having a fewest number of uses from among the LDs in the entry in which the GD is the gateway GW is the sensor node N3. However, a node having a highest priority is the relay node R4.

The relay node R4 has a higher throughput of communication than the sensor node N3, so the selector 15 of the sensor node N5 does not select the sensor node N3 but selects the relay node R4. As a result, the data frame is transferred from the relay node R4 that has a higher throughput of communication.

Next, the ad-hoc network 1 of FIG. 15 is described. The ad-hoc network 1 of the FIG. 15 is obtained by adding a relay node R9 and a relay node R10 to the ad-hoc network 1 of FIG. 14.

The sensor node N5 receives, from the sensor node N7, a data frame whose destination is the gateway GW. The sensor node N5 refers to a routing table and extracts each of the LDs in an entry in which the GD is the gateway GW as a candidate for a transfer destination of the data frame.

As a candidate for a transfer destination, there are four nodes, the sensor node N2, the sensor node N3, the relay node R4, and the relay node R9. The selector 15 refers to the routing table and extracts, from among the candidates, a candidate having a highest priority.

In the example of FIG. 15, the types of device of the relay node R4 and the relay node R9 are "2", and the types of device of the sensor node N2 and the sensor node N3 are "1". Thus, the selector 15 of the sensor node N5 selects, as a candidate for a transfer destination of the data frame, the relay node R4 and the relay node R9 that have a highest priority.

In this case, the transfer destinations of the data frame are not narrowed down to one. Then, the selector 15 of the sensor node N5 refers to the routing table and extracts the number of uses corresponding to the relay node R4 and the number of uses corresponding to the relay node R9.

In the example of FIG. 15, the number of uses corresponding to the relay node R4 is "1", and the number of uses corresponding to the relay node R9 is "2". The selector 15 selects the relay node R4 having a fewest number of uses. As a result, the communication unit 11 transfers the data frame to the relay node R4 selected by the selector 15.

Each node that joins the ad-hoc network 1 belongs to one or a plurality of layers according to the type of device. For example, when all of the nodes that join the ad-hoc network 1 are sensor nodes N, each of the sensor nodes N belongs to a layer in which the type of device is "1".

In the example of FIG. 15, seven sensor nodes N in total belong to the layer in which the type of device is "1", and four relay nodes R in total belong to the layer in which the type of device is "2". The layer in which the type of device is "2" has a higher priority than the layer in which the type of device is "1".

When all candidate nodes for a transfer destination of a data frame belong to the same layer, the selector 15 of each node selects a transfer destination of the data frame on the basis of the number of uses for each of the candidate nodes.

On the other hands, when the candidates for a transfer destination of the data frame include a node that belongs to a layer in which the type of device has a higher priority, the selector 15 of each node selects a node having a fewest number of uses from among the nodes that belong to the layer in which the type of device has a higher priority.

Next, an example of selecting a transfer destination in consideration of distance is described. The ad-hoc network 1 in the example of FIG. 16 is obtained by excluding the relay node R0 from the ad-hoc network 1 in the example of FIG. 15. Thus, the relay node R4 transfers a data frame to the gateway GW.

When the communication unit 11 of the sensor node N5 receives a data frame whose destination is the gateway GW, the selector 15 selects a transfer destination of the data frame. In the example of FIG. 16, the candidate nodes to which the data frame is to be transferred are four nodes, that is, the sensor node N2, the sensor node N3, the relay node R4, and the relay node R9.

The selector 15 of the sensor node N5 refers to a routing table and selects a node having a type of device that has a highest priority from among the candidates. In this case, the relay node R4 and the relay node R9 are selected, which means that the transfer destinations are not narrowed down to one.

The selector 15 extracts, in the routing table, the distance corresponding to the relay node R4 and the distance corresponding to the relay node R9. The selector 15 selects a node whose distance is the smaller of the distances of the two nodes.

As described above, the distance corresponds to the number of transfers of a data frame. Thus, the selector 15 selects a transfer-destination node from among a plurality of candidates on the basis of the number of transfers of the data frame.

As illustrated in FIG. 16, the distance corresponding to the relay node R4 is "1", and the distance corresponding to the relay node R9 is "2". Thus, the selector 15 of the sensor node N5 selects the relay node R4 as a transfer destination of the data frame. The communication unit 11 of the sensor node N5 transfers the data frame to the selected relay node R4.

Thus, the data frame whose destination is the gateway GW is transferred from the sensor node N7 to the gateway GW with a smallest number of transfers.

When, as a candidate for a transfer destination of a node N, there are a plurality of candidates respectively having a type of device that has a highest priority, and when, from among the candidates, there are a plurality of candidates having a smallest distance, the selector 15 selects a transfer destination node on the basis of the number of uses.

Next, a flowchart that illustrates a flow of processing according to the variations is described. The processing according to the variations is different from that in the flowcharts illustrated in FIGS. 11 and 12 in that it has different processing of selecting a transfer-destination node than that in Step S17 of FIG. 12. It is similar to that of FIGS. 11 and 12 except for the processing of Step S17, so its description is omitted.

On the basis of the destination of a received data frame, the selector 15 of the certain sensor node N extracts, as a candidate for a transfer destination of the data frame, each of the LDs in the entry, in a routing table, in which the GD corresponds to the destination of the data frame.

The selector 15 of the certain sensor node N extracts the type of device of each of the candidates in the routing table (Step S20-1). The selector 15 extracts a candidate having a type of device that has a highest priority from among the types of device of the respective candidates as a candidate for a transfer destination. When there are not a plurality of candidates respectively having a type of device that has a highest priority (NO in Step S20-1), the candidates for a transfer destination of the data frame are narrowed down to one.

In this case, the selector 15 selects a node having a type of device that has a highest priority as a transfer destination (Step S20-3). When there are a plurality of candidates respectively having a type of device that has a highest priority (YES in Step S20-1), the candidates for a transfer destination of the data frame are not narrowed down to one.

In this case, the selector 15 refers to the distance of each of the candidates in the routing table (Step S20-4). The candidate in this case is a candidate that has a highest priority. The selector 15 extracts a candidate having a smallest distance from among the distances of the respective candidates.

When there are not a plurality of candidates having a smallest distance (NO in Step S20-5), the candidates for a transfer destination of the data frame are narrowed down to one. In this case, the selector 15 selects a node having a smallest distance as a transfer destination of the data frame (Step S20-6). The selected transfer destination of the data frame is a sensor node N that has a highest priority and has a smallest distance.

When there are a plurality of candidates having a smallest distance (YES in Step S20-5), the candidates for a transfer destination of the data frame are not narrowed down to one. In this case, the selector 15 refers to the number of uses for each of the candidates in the routing table (Step S21).

When there are not a plurality of candidates having a fewest number of uses (NO in Step S22), the selector 15 selects a sensor node N having a fewest number of uses as a transfer destination (Step S23).

When there are a plurality of candidates having a fewest number of uses (YES in Step S22), the selector 15 adds a random number to each of the numbers of uses for the plurality of candidates (Step S24). Then, the selector 15 selects, on the basis of a result of the addition, a transfer-destination sensor node N (Step S25).

In the above description, the selector 15 selects, as a transfer destination, a node having a fewest number of uses from among a plurality of candidates for a transfer destination according to the destination of a received data frame, but it may select, as a transfer destination, a node whose number of uses is fewer than a prescribed value.

For example, the selector 15 may select, as a transfer destination, a node whose number of uses is the second fewest. It is presumed that the node whose number of uses is the second fewest is also under a light communication load. Thus, also in this case, a communication load can be distributed.

Further, the selector 15 may select, as a transfer destination, a node having a number for priority larger than a prescribed value from among the plurality of candidates for a transfer destination according to the destination of the received data frame. Furthermore, the selector 15 may select, as a transfer destination, a node whose distance is smaller than a prescribed value from among the plurality of candidates for a transfer destination according to the destination of the received data frame.

<Example of Hardware Configuration of Node>

Figure 18:
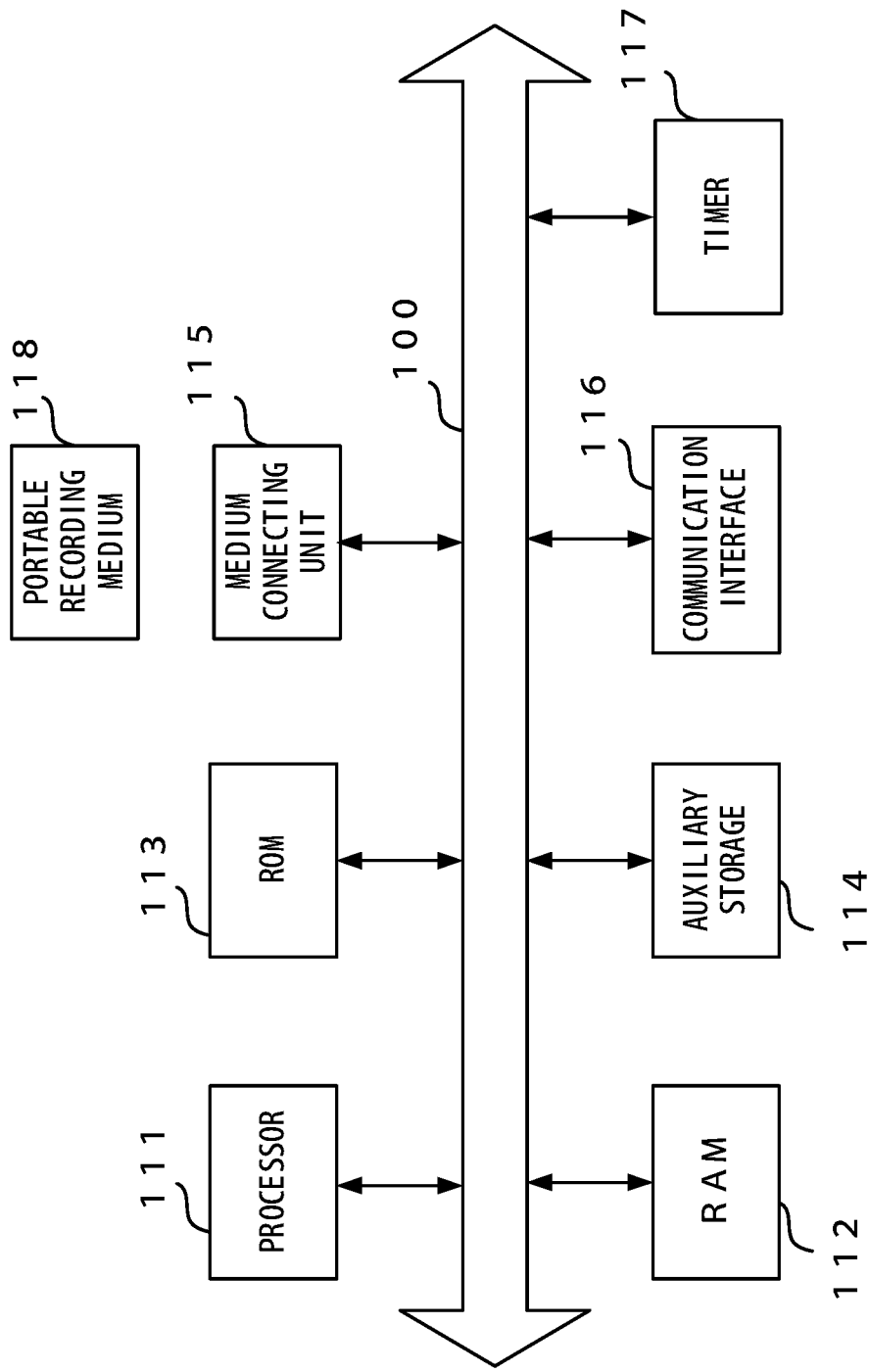
FIG. 18 is a diagram that illustrates an example of a hardware configuration of a node.

Next, an example of a hardware configuration of a node is described with reference to the example of FIG. 18. As illustrated in the example of FIG. 18, a processor 111, a RAM 112, a ROM 113, an auxiliary storage 114, a medium connecting unit 115, a communication interface 116, and a timer 117 are connected to a bus 100.

The processor 111 is any processing circuit. The processor 111 executes a program deployed in the RAM 112. As a program to be executed, a program that performs the processing according to the embodiments may be applied. The ROM 113 is a nonvolatile storage that stores therein the program deployed in the RAM 112.

The auxiliary storage 114 is a storage that stores therein various pieces of information, and, for example, a hard disk drive or a semiconductor memory may be applied as the auxiliary storage 114. The medium connecting unit 115 is provided connectively to a portable recording medium 118.

As the portable recording medium 118, a portable memory or an optical disk (such as a compact disc (CD), a digital versatile disc (DVD), and a semiconductor memory) may be applied. The program that performs the processing according to the embodiments may be recorded in the portable recording medium 118.

The communication interface 116 is an interface that communicates with the outside. The timer 117 is, for example, a hardware timer.

The processing unit 12, the random number generator 14, and the selector 15 of the sensor node N may be realized by the processor 111 executing a prescribed program. The communication unit 11 may be realized by the communication interface 116. The storage 13 may be realized by the RAM 112 or the auxiliary storage 114. The clock unit 16 may be realized by the timer 117.

All of the RAM 112, the ROM 113, the auxiliary storage 114, and the portable storage medium 118 are examples of a computer-readable tangible storage medium. These tangible storage media are not a transitory medium such as a signal carrier.

<Other>

According to the above embodiment, a communication load in a network can be distributed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transfer destination selecting method conducted by a communication device that includes a communication interface, the transfer destination selecting method comprising:
   selecting, when the communication device stores, according to a destination, pieces of information indicating a plurality of other communication devices that are candidates for a transfer destination of data, another communication device to be the transfer destination from among the candidates on the basis of a lowest number of referred destinations, the number of referred destinations being a number of destinations that are registered in a routing table used for controlling a data transfer and that are referred to within a prescribed period of time, the number of destinations older than the prescribed period of time still being in the routing table but not considered part of the referred destinations, the routing table being stored in each of the plurality of other communication devices; and controlling the communication interface to transfer the data to the selected communication device, wherein when the selected another communication device refers to a destination which has not been referred to within the prescribed period of time at the time of selecting the selected another communication device, a number of referred destinations in the routing table of the selected another communication device is increased, and when the communication device is to select another transfer destination of data, the communication device uses the increased number of referred destinations as the number of referred destinations of that another communication device.

2. The transfer destination selecting method according to claim 1, wherein the communication device receives, from the plurality of other communication devices, pieces of information indicating the number of destinations in the routing table, by use of confirmation signal data or data transmitted from a gateway.

3. The transfer destination selecting method according to claim 1, wherein the communication device selects another communication device having a fewest number of destinations from among the numbers of destinations in the routing tables stored in the plurality of other communication devices, respectively.

4. The transfer destination selecting method according to claim 1, wherein the communication device selects another communication device to be a transfer destination of data from among the candidates on the basis of the information on a type of device that corresponds to each of the plurality of other communication devices.

5. The transfer destination selecting method according to claim 1, wherein the communication device selects another communication device to be a transfer destination of data from among the candidates on the basis of the number of times that the data is transferred up to the destination.

6. The transfer destination selecting method according to claim 1, wherein the communication device selects another communication device to be the transfer destination of the data on the basis of a number of destinations obtained by excluding a destination that is not referred to for a prescribed period of time from the destinations in the routing table stored in each of the plurality of other communication devices.

7. The transfer destination selecting method according to claim 3, wherein, when there are a plurality of the another communication devices having a fewest number of destinations, the communication device selects another communication device to be the transfer destination on the basis of the number of destinations and a random number.

8. A communication device comprising:

a storage;

a communication interface; and a processor configured to execute a process including:

selecting, when the communication device stores, according to a destination, pieces of information indicating a plurality of other communication devices that are candidates for a transfer destination of data, another communication device to be the transfer destination from among the candidates on the basis of a lowest number of referred destinations, the number of referred destinations being a number of destinations that are registered in a routing table used for controlling a data transfer and that are referred to within a prescribed period of time, the number of destinations older than the prescribed period of time still being in the routing table but not considered part of the referred destinations, the routing table being stored in each of the plurality of other communication devices; and controlling the communication interface to transfer the data to the selected communication device, wherein when the selected another communication device refers to a destination which has not been referred to within the prescribed period of time at the time of selecting the selected another communication device, a number of referred destinations in the routing table of the selected another communication device is increased, and when the communication device is to select another transfer destination of data, the communication device uses the increased number of referred destinations as the number of referred destinations of that another communication device.

9. A non-transitory computer-readable recording medium having stored therein a transfer destination selecting program that causes a communication device to execute a process comprising:

selecting, when the communication device stores, according to a destination, pieces of information indicating a plurality of other communication devices that are candidates for a transfer destination of data, another communication device to be the transfer destination from among the candidates on the basis of a lowest number of referred destinations, the number of referred destinations being a number of destinations that are registered in a routing table used for controlling a data transfer and that are referred to within a prescribed period of time, the number of destinations older than the prescribed period of time still being in the routing table but not considered part of the referred destinations, the routing table being stored in each of the plurality of other communication devices; and controlling a communication interface of the communication device to transfer the destination data to the communication device, wherein when the selected another communication device refers to a destination which has not been referred to within the prescribed period of time at the time of selecting the selected another communication device, a number of referred destinations in the routing table of the selected another communication device is increased, and when the communication device is to select another transfer destination of data, the communication device uses the increased number of referred destinations as the number of referred destinations of that another communication device.

* * * * *